United States Patent [19]

Morehouse et al.

[11] Patent Number: 5,463,507
[45] Date of Patent: Oct. 31, 1995

[54] LOW PROFILE DISK DRIVE APPARATUS INCORPORATING A THREE-TIERED HOUSING

[75] Inventors: James H. Morehouse, Jamestown; David M. Furay; John Blagaila, both of Boulder; F. Eugene Dion; Scott A. Shelstad, both of Longmont; Jimmy L. Woods, Arvada, all of Colo.

[73] Assignee: Conner Peripherals, Inc., San Jose, Calif.

[21] Appl. No.: 161,684

[22] Filed: Dec. 2, 1993

Related U.S. Application Data

[60] Continuation of Ser. No. 702,935, May 20, 1991, abandoned, which is a division of Ser. No. 432,664, Nov. 6, 1989, Pat. No. 5,025,336.

[51] Int. Cl.⁶ .................................................. G11B 33/14
[52] U.S. Cl. ........................................................ 360/97.02
[58] Field of Search .................. 360/97.01, 97.02–97.04, 360/98.07, 99.04, 99.08, 99.12, 900–904

[56] References Cited

U.S. PATENT DOCUMENTS

| | | | |
|---|---|---|---|
| 4,346,416 | 8/1982 | Riggle et al. | 360/97.01 |
| 4,628,384 | 12/1984 | Raj et al. | 360/99.08 |
| 4,772,974 | 9/1988 | Moon et al. | 360/903 |
| 4,933,785 | 6/1990 | Morehouse et al. | 360/903 |
| 4,965,684 | 10/1990 | Stefansky | 360/97.01 |
| 5,025,335 | 6/1991 | Stefansky | 360/97.01 |
| 5,034,837 | 7/1991 | Schmitz | 360/105 |
| 5,235,482 | 8/1993 | Schmitz | 360/97.02 |

OTHER PUBLICATIONS

Computer Library Periodicals, Jan. 1989; Doc #3532 "Computer Design"; Nov. 1, 1988; vol. 27, No. 20, p. 105.
"Prairie Tek Planning 2..." Doc #22800 PC Week Nov. 6, 1989 vol. 6, No. 44, p. 16.

*Primary Examiner*—John H. Wolff
*Attorney, Agent, or Firm*—Fliesler, Dubb, Meyer & Lovejoy

[57] ABSTRACT

The present invention provides a disk drive apparatus for use in computer systems where size and weight are of paramount concern. The disk drive apparatus includes a 2.5 inch disk that provides between 20–40 megabytes of storage within a footprint area of approximately 2.8 inches by approximately 4.0 inches. Further, the disk drive has a height of 0.630 inch or less. The height dimension is achieved, in part, by providing a low profile spin motor to rotate the disk. The low profile spin motor uses high energy magnets made of rare earth materials. The disk drive also employs a rotary actuator having a voice coil assembly of reduced height by using the housing as a flux return path for the magnetic fields produced by the voice coil motor. Also provided is a three-tiered housing that contains the disk which, when connected to a printed circuit board, produces the low profile disk drive apparatus.

4 Claims, 15 Drawing Sheets

NO COMPONENTS

COMPONENTS HAVING A NOMINAL HEIGHT OF 0.050"

COMPONENTS HAVING A NOMINAL HEIGHT OF 0.127"

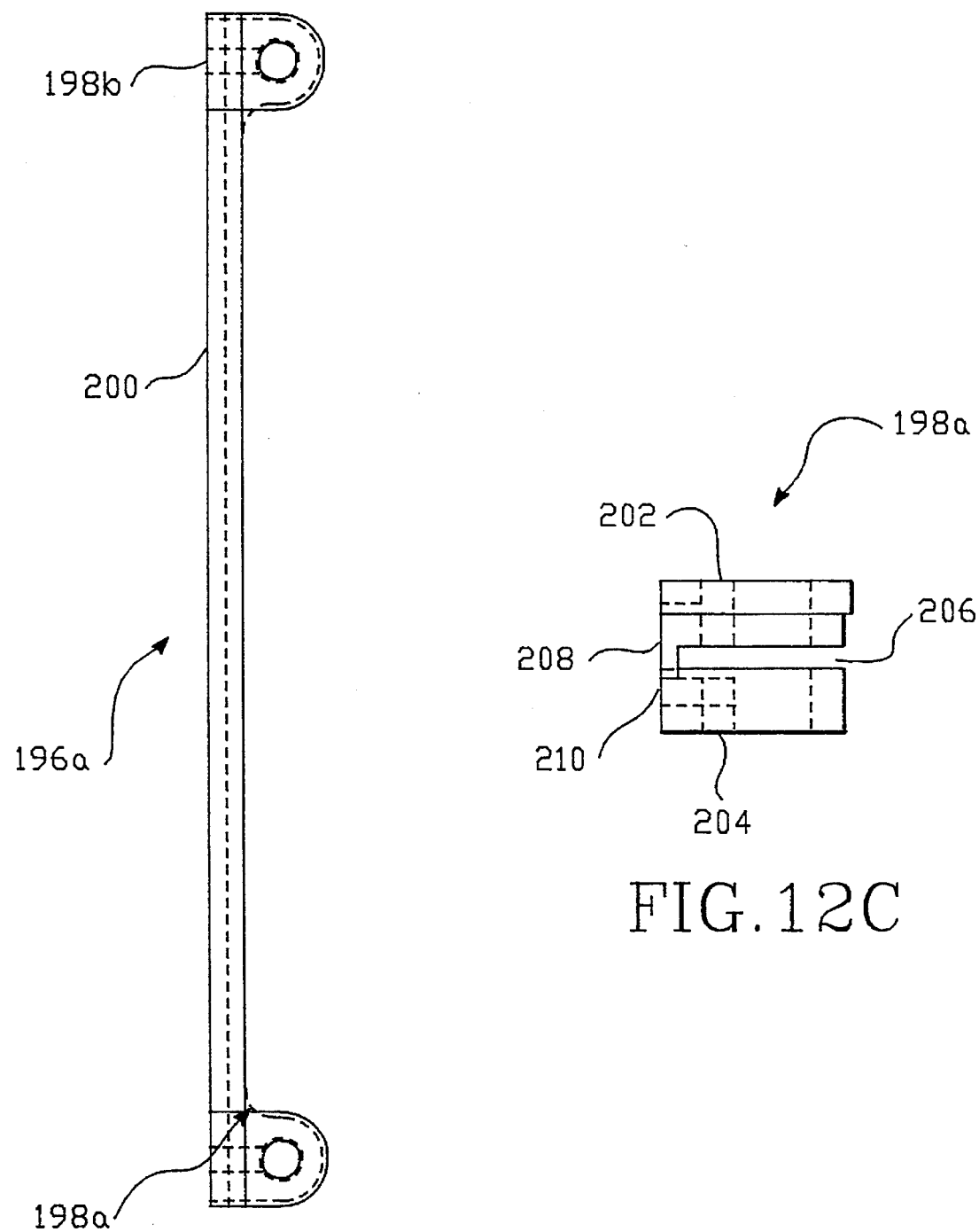

LOW PROFILE DISK DRIVE APPARATUS INCORPORATING A THREE-TIERED HOUSING

This application is a Continuation of Ser. No. 07/702,935, filed May 20, 1991, now abandoned, which is a Division of Ser. No. 07/432,664, filed Nov. 6, 1989 which issued as U.S. Pat. No. 5,025,336.

FIELD OF THE INVENTION

The present invention relates to a disk drive apparatus for providing Information storage in a computer system.

BACKGROUND OF THE INVENTION

Mini-computer systems and main-frame computer systems typically employ disk drives for mass information storage. Generally, such systems are not portable and are housed in large rooms having controlled environments. Consequently, the weight and space occupied by such systems are of little concern. Recently, however, the advent of personal computer systems and portable computer systems has placed a premium on providing disk drives of reduced size and weight. Exemplary of such a disk drive is U.S. Pat. No. 4,712,416 which issued on Dec. 8, 1987, to Moon et al. for a "Thin and Compact Micro-Winchester Head and Disk Assembly". The invention of Moon et al., includes a housing for containing a 95 mm hard disk that provides at least ten megabytes of storage, a spindle motor for rotating the hard disk and a rotary actuator assembly for moving transducers relative to the hard disk. The disk drive is 6¾" in length, 4" in width and has a height of 1" exclusive of a printed circuit board. Also known is the disk drive disclosed in International Application WO 88/09551, which published on Dec. 1, 1988, and is entitled "Disk Drive Architecture". Disclosed is a disk drive apparatus that includes a base-plate that provides a mounting surface for a spindle motor that rotates a 3.5" hard disk and a rotary actuator assembly that moves transducers relative to the hard disk. The base-plate is attached to an end-plate. The base-plate/end-plate assembly fits into, and establishes a seal with, an open-ended casing. A unitized frame attaches the end-plate/casing assembly to a printed circuit board and provides shock absorbing capability. The disk drive is 5¾" in length, 4" in width and has a height of 1½". Conner Peripherals also produces a low-profile disk drive which is approximately 5¾"×4"×1". Also known is the Model 220 disk drive produced by the assignee of the present invention and the subject of U.S. patent application Ser. No. 07/162,799 and International Application WO 89/08313, which are incorporated herein by reference. The Model 220 disk drive includes a housing for containing two hard disks with each providing an information storage capacity of 5–10 MBytes, a spin motor for rotating the hard disks, transducers for communicating with the hard disk, and a rotary actuator for moving the transducers relative to the hard disks. A printed circuit board having circuitry for controlling various components of the disk drive and the housing are attached to one another in a stacked relationship that results in an overall length of 4.30", a width of 2.80" and a height of 1.00" for the disk drive including the printed circuit board.

Of importance in achieving a reduced height dimension is the height of the components contained within the disk drive housing and especially the height of the spin or spindle motor that rotates the hard disk(s). Presently, spin motors have heights on the order of 0.6 inches. Exemplary of such a spin motor is the aforementioned Model 220 disk drive produced by the assignee of the present invention.

Also of importance in attaining a low profile disk drive is the height profile of the rotary actuator. The rotary actuator disclosed in the aforementioned patent to Moon et al., includes a triangular electromagnetic voice coil surrounded by upper and lower magnets. Surrounding the upper and lower magnets are flux return plates that are attached to the housing and constrain the magnetic fields produced by the magnets to a gap area between the magnets as well as prevent the magnetic fields produced by the magnets and the voice coil from affecting the hard disk(s). Consequently, the height of at least a portion of the rotary actuator is defined by two flux return plates, two sets of magnets and a voice coil. The Model 220 disk drive uses a similar arrangement. The rotary actuator used in the disk drive disclosed in International Application WO 88/09551 includes an electromagnetic voice coil that surrounds a center pole. The center pole cooperates with a base plate and a top plate located below and above, respectively, of the electromagnetic voice coil to provide flux return paths. Consequently, the height of the rotary actuator is determined by the voice coil, the center pole and the top and bottom plates. Also known are linear voice coil actuators that have a housing that provides a surface for attaching the actuator to the disk drive housing. The actuator housing provides a flux return path as well as prevents the entry of contaminants into the disk drive housing.

Of related interest in producing a disk drive of reduced height is the attachment to the housing of a printed circuit board having electronics for controlling one or more of the components of the disk drive. The U.S. Pat. No. 4,712,416 to Moon et al., discloses a printed circuit board having electronics for controlling the multiple windings of the spindle motor. To attain a low profile disk drive, the printed circuit board is located in a recess located on the exterior of the baseplate and adjacent the spindle motor. Apparently, the circuitry for controlling other aspects of the disk drive, like read/write control and actuator servo control, are located on another printed circuit board. The International Application WO 88/09551 illustrates a printed circuit board that is attached to the casing by a frame and provides electronics for controlling the hardware housed within the casing. The portion of the casing facing the printed circuit board appears to be devoid of any recesses. Consequently, the printed circuit board must be spaced from the casing by a distance greater than the highest profile component on the side of the printed circuit board facing the casing. The Model 220 disk drive piggybacks the disk drive housing on the printed circuit board. The portion of the housing facing the printed circuit board includes a first level defined by the spin motor and the rotary actuator, a second level recessed from the first level and a third level recessed from the second level. Electronic components are located on the side of the circuit board facing the housing to take advantage of the recesses defined by the second level. A connector for establishing a communication link between the electronics on the circuit board and a flexible circuit that extends into the housing and communicates with components contained therein is located on the side of the circuit board facing the housing and utilizes the recess defined by the third level.

Another important aspect associated with disk drives employed in personal and/or portable computer systems is the frame used to attach the housing and/or printed circuit board to the user's computer system. The Model 220 disk drive does not use a frame. Instead, the Model 220 uses the printed circuit board to bottom mount the disk drive to the user's computer system as well as support the housing. The light weight of the housing and the components contained therein makes such an arrangement possible. While such a configuration reduces cost, saves space and reduces the overall size of the disk drive, it lacks shock absorbing capability, has grounding problems and does not accommodate other mounting configurations. The frame of the disk drive disclosed in International Application WO 88/09551 supports both the printed circuit board and the housing. The frame also provides side and bottom mounting capability together with shock absorbing capability. However, the frame has a surface area that requires grounding and does not provide top mounting capability. The disk drive produced by Conner Peripherals employs a housing having a base-plate with two side rails that provide side and bottom mounting capability.

An important factor affecting the performances of disk drives is the entry of contaminates, such as dirt or dust or moisture, into the housing. Presently, disk drives use ambient or breather filters to prevent the entry of contaminants, like dust and dirt, into the interior of the housing. Exemplary of such filters are the ones employed in the Model 220 disk drive and the disk drive disclosed in the patent to Moon et al. While ambient or breather filters inhibit the entry of dust and dirt into the interior of the disk drive housing, they are ineffective at inhibiting the entry of water vapor. Consequently, desiccants contained within box-like structures have been placed in the interior of the housing to adsorb water vapor contained therein. The Model 220 disk drive uses a desiccant contained within a box-like structure. While a relatively large amount of desiccant can be provided in this way, the use of box-like structures creates longer diffusion paths, i.e. the distance a water molecule must travel upon entering box-like structures before adsorption occurs. The longer adsorption paths, in turn, reduce the rate of adsorption of the desiccant.

Also of importance to the operation of a disk drive is the effect that the flexible circuit used to communicate with a rotary actuator and/or transducers attached to the rotary actuator has on the rotary actuator. Typically, flexible circuits exert a force or torque on the rotary actuator. This torque affects the position of the transducers or heads relative to the disk. The disk drive apparatus disclosed in the International Application WO 88/09551 reduces this effect of the flexible circuit on the rotary actuator by using a flexible circuit with as large a radius of curvature as possible. The Model 220 disk drive imposes a double-curve on the flexible circuit to reduce its effect on the rotary actuator.

SUMMARY OF THE INVENTION

The present invention provides a disk drive apparatus that is especially suitable for use with computer systems where size and weight are of paramount concern. The preferred embodiment of the disk drive apparatus includes a 2½ inch hard disk that preferably provides 20 to 40 megabytes of information storage. The disk drive apparatus further includes a spin motor for rotating the hard disk, one or more transducers for communicating with the hard disk, and a rotary actuator for moving the transducers relative to the hard disk. The aforementioned components are contained within a housing that is approximately 4.00 inches by 2.75 inches. The housing provides, among other things, a protected environment in which the aforementioned components can operate. Also included in the preferred embodiment of the disk drive apparatus is a printed circuit board on which electronic circuitry for controlling one or more of the components contained within the housing is established. The printed circuit board is also approximately 4 inches in length by approximately 2.75 inches in width. A frame assembly is employed to attach the housing to the printed circuit board in a stacked or piggyback manner. Due to the stacked relationship between the housing and the printed circuit board established by the frame assembly, the disk drive apparatus has an overall footprint of approximately 4.0 inches in length by approximately 2.8 inches in width. This constitutes a reduction in length over the Model 220 disk drive produced by the assignee of the present invention which has a footprint with a length of about 4.3 inches.

The present invention also provides a low profile or low height disk drive apparatus. The height of the disk drive apparatus is, at least in part, determined by the height of the housing. The height of the housing, in turn, is determined by the height of the spin motor. The present invention provides a spin motor having a height of approximately 0.35 inches which is much less than the presently known spin motors which have heights of approximately 0.6 inches. The low profile spin motor of the present invention is realized by using a magnetic material that includes a rare earth, such as neodymium or samarium, to increase the operating flux level and therefore reduce the height of the magnets within the rotor portion of the spin motor while still maintaining adequate performance characteristics.

Another factor affecting the height of the disk drive apparatus is the various heights of the electronic components established on the printed circuit board. For instance, if all of the components are located on the side of the printed circuit board facing away from the housing, then the overall height of the disk drive apparatus will be determined by the component with the greatest height. The present invention avoids this problem by recessing the side of the housing that faces the printed circuit board and placing the components of greatest height on the side of the circuit board facing the housing so as to take advantage of the recesses. The ability to recess the housing is determined, at least in part, by the height dimension of the rotary actuator contained within the housing. The present invention provides a low profile rotary actuator that allows the housing to be recessed to an extent that allows components having a height of 0.050" to be accommodated. While these are not the highest profile components, placement of these components on the side of the printed circuit board facing the housing, as opposed to the other side of the printed circuit board, results in a printed circuit board having a footprint of approximately 4.00" by approximately 2.75". The low profile rotary actuator is achieved using a voice coil assembly that employs the housing as a magnetic flux return path for the magnetic fields created by the voice coil assembly. Consequently, the housing serves the following three purposes: (1) to protect or shield the components contained therein from the ambient atmosphere; (2) to provide a mounting surface for the spin motor and the rotary actuator; and (3) to act as a magnetic flux return path for magnetic fields produced by the voice coil assembly. By using the housing for all of these purposes, rather than providing separate elements to achieve all of these purposes, the present invention realizes a low profile rotary actuator. A further recess can be created in the housing so that components of a height of 0.127" can be accommodated. This further recess is determined by the distance from the spin motor mounting flange to the bottom surface of the hard disk. Use of the recesses, as determined by the height of the low profile rotary actuator and the distance from the spin motor mounting flange to the bottom of the hard disk, to accommodate components located on the side of the printed circuit board facing the housing results, in the preferred embodiment of the invention, in a disk drive having a height dimension of approximately 0.6".

Also provided by the present invention is a frame assembly for connecting the housing to the printed circuit board that does not require grounding, is low weight, and provides flexible mounting capability. The frame assembly, unlike frames previously employed in disk drive apparatus, is distributed. Specifically, the frame assembly in the preferred embodiment of the invention includes two separate but identical assemblies that attach the four corners of the housing to the four corners of the printed circuit board. The total surface area of the distributed frame is small enough, preferably less than five percent of the surface area of the housing, to not require grounding. In addition, the distributed frame assembly is extremely lightweight. Moreover, one embodiment of the frame assembly provides the capability to either top, bottom or side mount the disk drive to the user's computer system.

Also provided by the present invention is an ambient filter assembly that inhibits the entry of water vapor from the ambient atmosphere into the housing where it can adversely affect the operation of the disk drive apparatus. The ambient filter assembly inhibits entry of water vapor into the interior of the housing, in contrast to known ambient filters, by employing a hole between the ambient and the interior of the disk drive that creates a resistance to the entry of water vapor into the housing. The resistance is created by establishing a hole having a relatively long length and/or a relatively small diameter. Preferably, the hole has a helical or serpentine shape.

The present invention also provide an improved desiccant to adsorb moisture within the housing of the disk drive apparatus. Desiccants previously employed in the interiors of disk drive housings are typically in box-like structures that effectively reduce the adsorption rate of the desiccant. The present invention provides a compartment located between the exterior and interior surfaces of the housing to house a large, planar desiccant. The compartment is in communication with the interior of the housing. The large surface area of the planar desiccant results in an improved rate of adsorption.

Further provided by the invention is a flex circuit geometry that results in the flex circuit applying substantially zero torque to the rotary actuator.

BRIEF DESCRIPTION OF THE DRAWINGS

FIGS. 12B and 12C are top and side views, respectively, of one of two identical side members included in the alternative embodiment of the distributed frame system.

DETAILED DESCRIPTION OF THE PREFERRED EMBODIMENT

Figure 1:
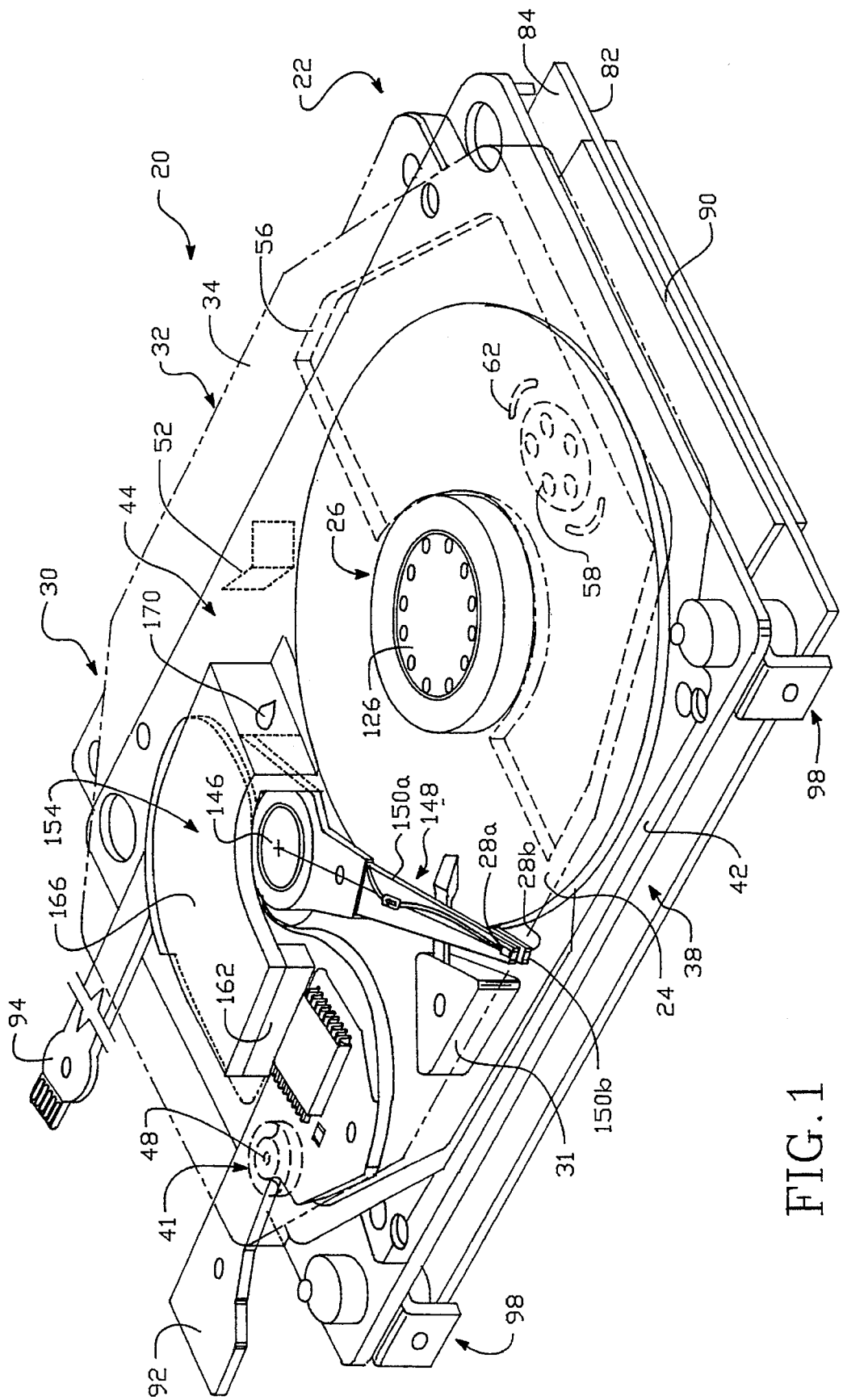
FIG. 1 is a perspective view of the preferred embodiment of the disk drive apparatus with the cover portion of the housing illustrated in ghost lines to allow illustration of the components contained within the housing.
Figure 2:
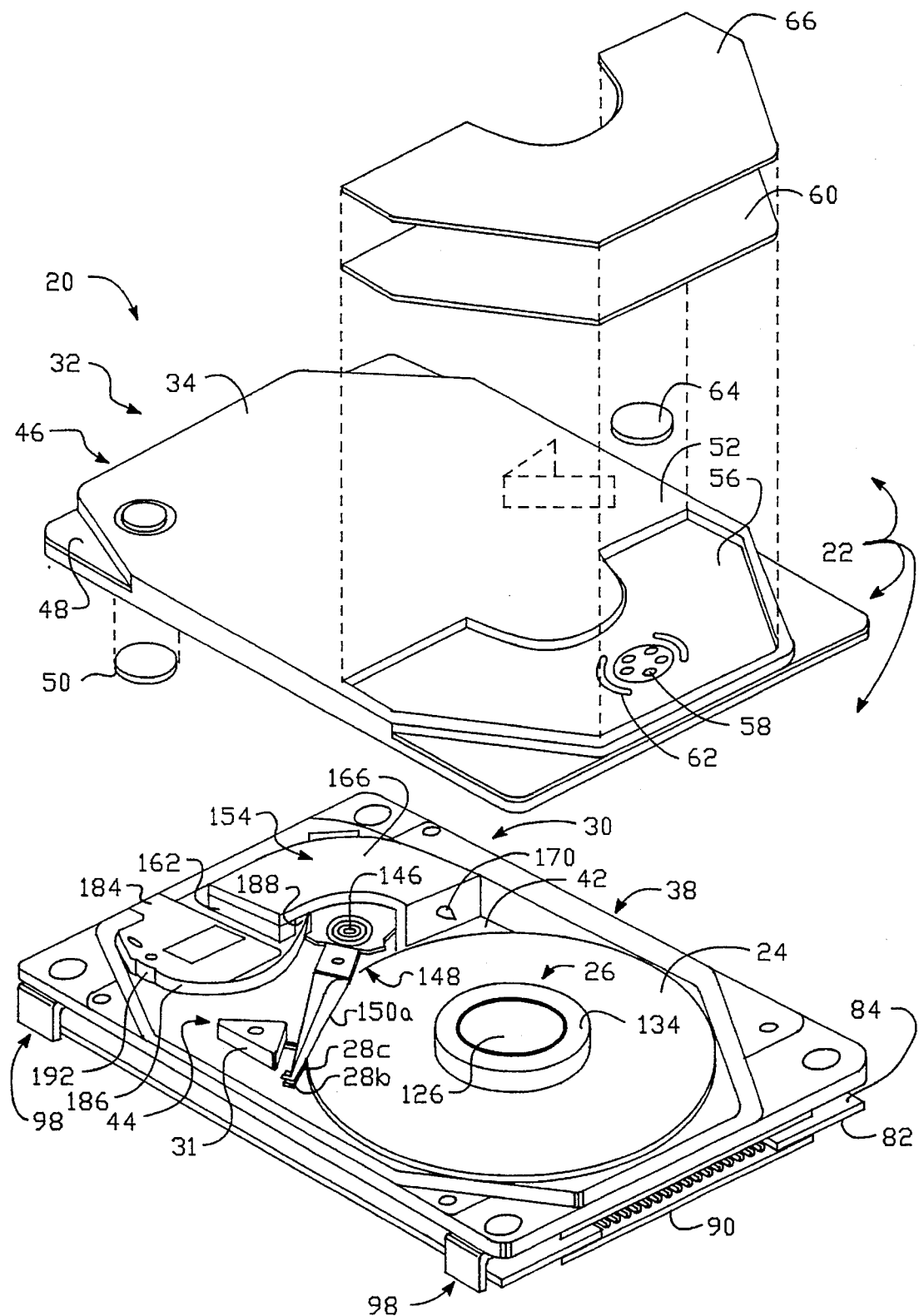
FIG. 2 is a perspective view of the preferred embodiment of the disk drive apparatus with the cover portion removed.
Figure 3:
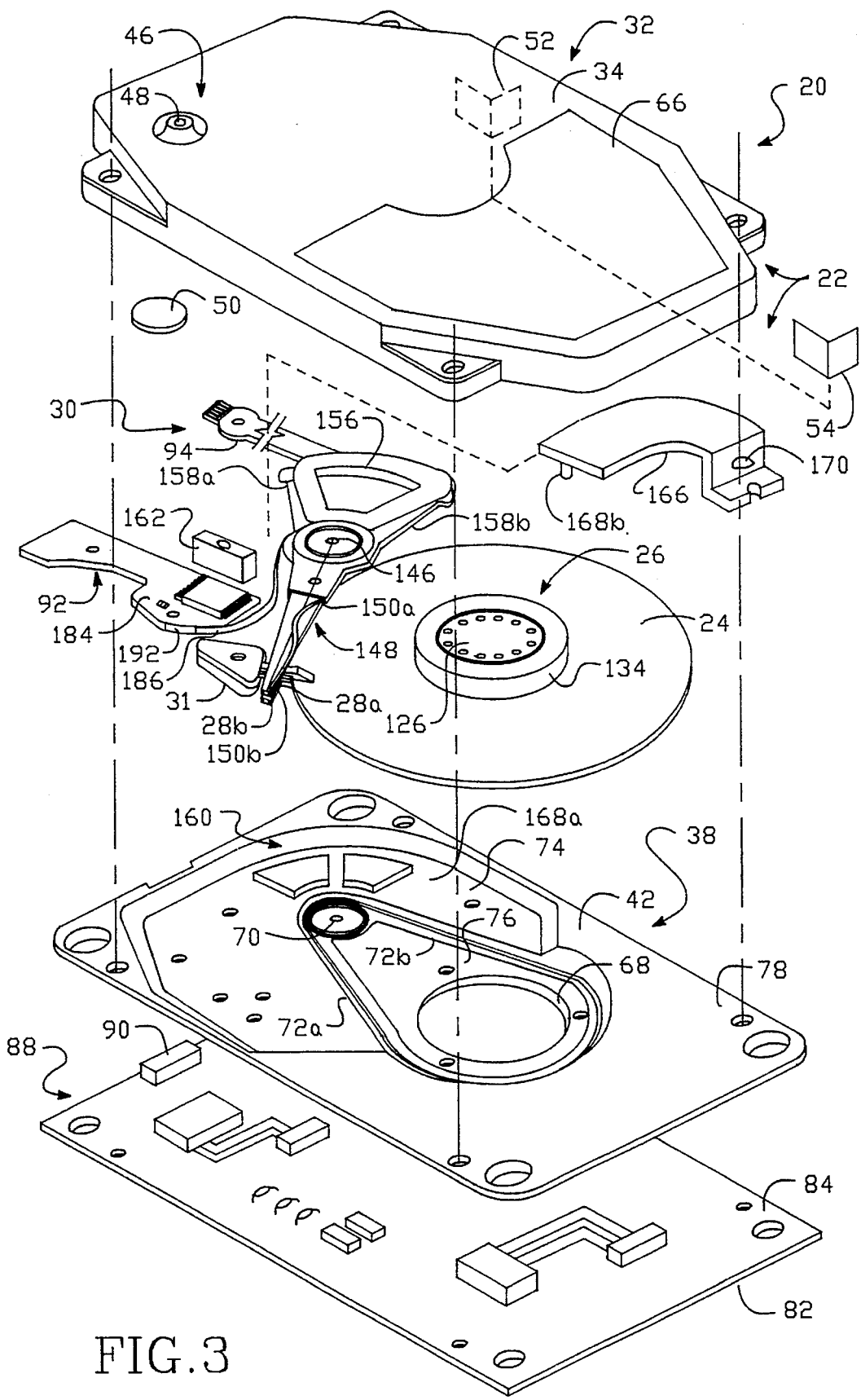
FIG. 3 is an exploded perspective view of the preferred embodiment of the disk drive apparatus.

The preferred embodiment of the present invention provides a disk drive apparatus having dimensional characteristics that make it particularly useful in portable computer systems or computer systems where space or volume is a primary concern. Of particular importance is the height dimension of the disk drive apparatus which is achieved by, among other things, reducing the height of the spin motor. By reducing the height of other components, such as the rotary actuator, contained within the housing of the disk drive apparatus a recessed exterior can be realized. The housing is piggy-backed on a printed circuit board that has the electronics for controlling various components of the disk drive apparatus contained within the housing. To attain a low-profile disk drive, high profile electronic components are established on the side of the printed circuit board facing the housing to take advantage of the aforementioned recesses. Further, the invention provides an improved frame that does not require grounding and accommodates various mounting configurations of the disk drive apparatus as well as provides shock mounting capability. The present invention also provides an ambient filter assembly that inhibits the penetration of water vapor from the ambient atmosphere into the interior of the housing. Also provided is a desiccant that is housed in the lid of the housing. The large surface area of the desiccant realized by placing it in the lid of the housing results in improved rate of adsorption of water vapor present in the housing. Moreover, the present invention provides an improved flex circuit geometry that results in the flex circuit applying substantially zero torque to the actuator and, hence, eliminating the need for the componentry and the space required thereby to compensate for such a torque. These and other advantages of the disk drive apparatus will be discussed hereinafter.

With reference to FIGS. 1–4, the preferred embodiment of the disk drive apparatus 20, hereinafter referred to as disk drive 20, is illustrated. The disk drive 20 includes a housing 22 for containing a 2½" hard disk 24, a spin motor 26 for rotating the hard disk 24, a pair of transducers 28a, 28b, for communicating with the upper and lower surfaces of the hard disk 24, and a rotary actuator assembly 30 for moving the transducers relative to the hard disk. A ramp structure 31 for unloading and storing the transducers 28a, 28b, is also contained within the housing 22. Preferably, the hard disk 24 is a magnetic disk capable of storing 20–40 MBytes, or even more, of information.

The housing includes a lid 32 having a first exterior surface 34 and a first interior surface 36 located substantially parallel to the first exterior surface 34. The housing also includes a base plate 38 that, among other things, provides a mounting surface for several of the aforementioned components. The base plate 38 includes a second exterior surface 40 and a second interior surface 42 located substantially parallel to the second exterior surface 40. The base plate 38 is made of a magnetically conductive material, such as steel, to provide a magnetic flux return path for use in the voice coil assembly of the rotary actuator 30. When assembled, the lid 32 is attached to the base plate 38 to form an interior space 44 that contains the aforementioned components of the disk drive apparatus 20. Preferably, a T-shaped gasket or L-shaped gasket (not shown) is employed intermediate the lid 32 and the base plate 38 to prevent contaminants from the ambient atmosphere from entering into the interior space 44 of the housing 22 and affecting the operation of the disk drive apparatus 20.

The lid 32 includes an ambient filter assembly 46 that inhibits contaminants, such as dust and dirt and, other particulates, from entering the interior space 44 of the housing 22. The ambient filter assembly 46 includes a helically-shaped hole 48 that extends from the first exterior surface 34 to the first interior surface 36 and inhibits the entry of water vapor into the interior space 44 of the housing 22. Holes having other shapes that result in a hole having a length greater than the shortest distance between the first exterior surface 34 and the first interior surface 36 of the lid 32 are also possible. For instance, a hole that is slanted or curved relative to the first exterior surface 34 and/or first interior surface 36 would lengthen the path that any water vapor would have to travel to enter the interior space 44 of the housing 22 and, hence, inhibit the entry of the water vapor. One such alternative to the helically-shaped hole 48 is a serpentine-shaped hole. The ambient filter assembly 46 also includes a first filter 50 for inhibiting the entry of contaminants from the ambient atmosphere, such as dust and dirt and other particulates, into the interior space 44. The first filter 48 is located on the first interior surface 36 of the lid 32 adjacent to the helically-shaped hole 48.

The lid 32 also includes a mounting surface 52 for an L-shaped recirculating filter 54 that utilizes the flow of air produced by the rotation of the hard disk 24 to trap contaminants, such as dust and dirt, that are within the housing 22.

The lid 32 also includes a compartment 56 that communicates with the interior space 44 by holes 58 and houses a planar desiccant 60 that adsorbs, until it reaches an equilibrium point with the atmosphere in the interior space 44 of the housing 22, any water vapor that has entered into the interior space 44. First ribs 62 are also included within the compartment 56 to elevate the planar desiccant 60 from the bottom surface of the compartment and, hence, expose the entire bottom surface area of the planar desiccant 60. The first ribs 62 also serve to contain a second filter 64 that is located intermediate the desiccant 60 and the first interior surface 36 of the lid 32. The second filter 64 prevents any of the planar desiccant 60 from entering the interior space 44 and possibly affecting the operation of the disk drive 20. An exterior hatch 66 allows access to the compartment 56 during manufacturing, but is thereafter sealed. The large surface area of the planar desiccant 60 made possible by its location in the lid 32 improves the ability of the planar desiccant 60 to adsorb water vapor. The reduction in water vapor penetration of the housing 22 achieved by the helically-shaped hole 48 also reduces the amount of water vapor that the planar desiccant 60 must adsorb.

Figure 13:
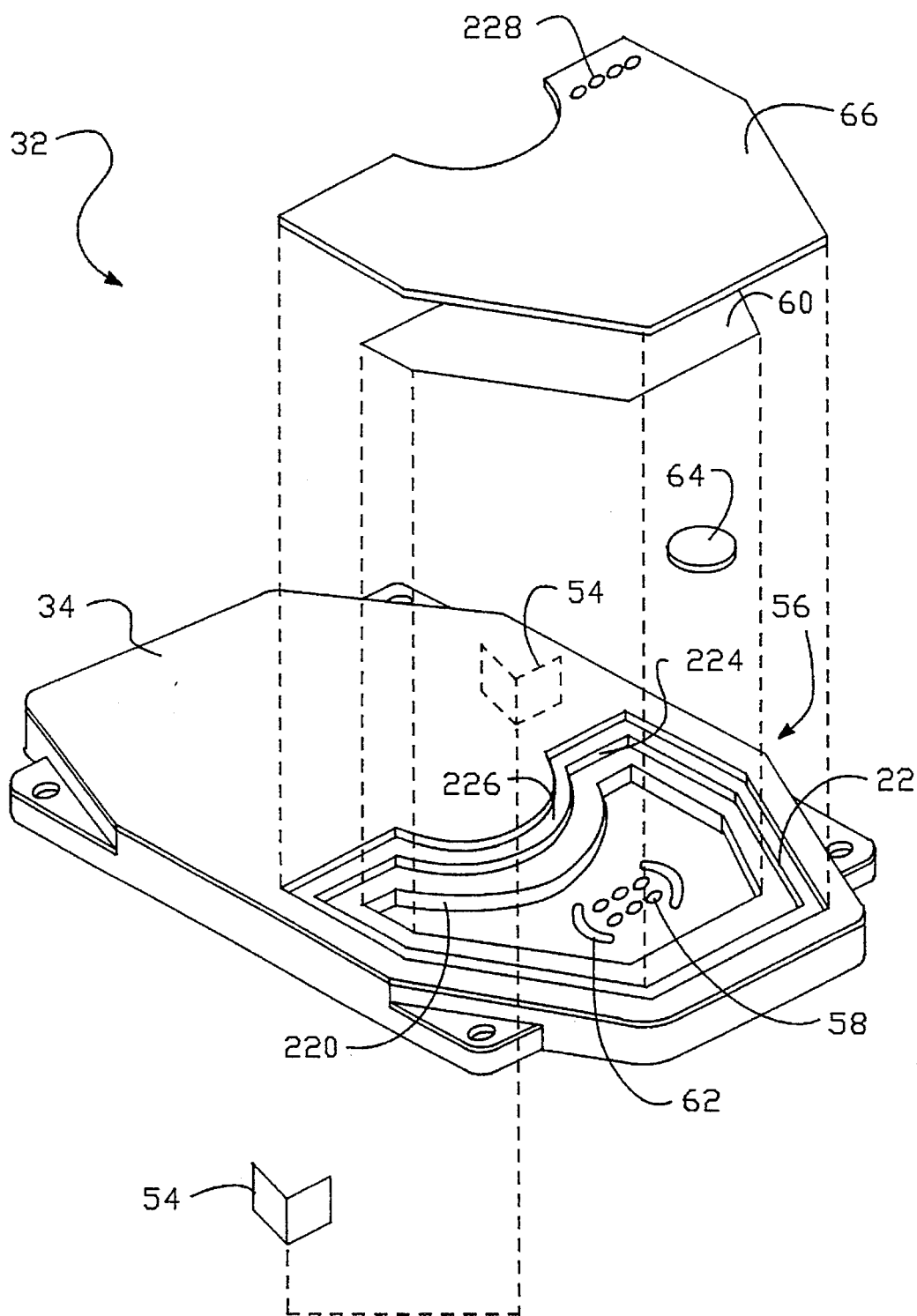
FIG. 13 is an alternative embodiment of the ambient air filter assembly that reduces the penetration of water vapor from the ambient atmosphere into the interior of the housing.

With reference to FIG. 13, an alternative embodiment of the ambient filter assembly 46 is illustrated. The alternative embodiment of the ambient filter assembly 46 is implemented by modifying compartment 56 used to house the planar desiccant 60 to include a ledge 220 having a slot 222 with a first end 224 and a second end 226. The lid 32 is also modified to include holes 228 that communicate with the first end 224 of the slot 222. The second end 226 of the slot 222 terminates adjacent to the top side of the planar desiccant 60. The lid 32, when in place, cooperates with the slot 222 to form a relatively long serpentine path for ambient air to enter the interior space 44 of the housing 22. Preferably, the serpentine path also has a relatively small diameter. The length of the serpentine path together with its relatively small diameter inhibits the passage of water vapor from the ambient atmosphere into the interior space 44 of the housing 22. Furthermore, by locating the serpentine path in series with the planar desiccant 60, any water vapor or condensed moisture from the ambient atmosphere that has migrated from the first end 224 to the second end 226 of the slot 222 can be adsorbed by the planar desiccant 60 and thereby prevented from reaching the interior space 44 of the housing 22.

Characteristic of the base plate 38 is its three-level shape where each level is determined by one or more of the components contained within the housing 22. For purposes of this description, the first level will be considered the one farthest from the lid 32, the third level will be the one closest to the lid 32, and the second level will be at a point intermediate the first and third levels. The first level is determined by the heights of spin motor 26 and the rotary actuator 30. The first level is defined, at least in part, by a a bottom surface of the spin motor 26. The spin motor 26 is mounted to the base plate 38 such that the bottom surface 67 extends through a spin motor mounting hole 68 in the base plate 38. The first level is also defined by a first well 70 for receiving a pivot capstan of the rotary actuator 30, and first and second reinforcing ribs 72a, 72b, that extend tangentially between the spin motor mounting hole 68 and the first well 70. The first and second reinforcing ribs 72a, 72b, establish a triangular relationship between the spin motor mounting hole 68 and the first well 70 that reduces distortion of the base plate 38 due to the operation of the spin motor 26 or the rotary actuator 30. By reducing distortion, the first and second reinforcing ribs 72a, 72b, reduce the time necessary for the rotary actuator 30 to position the transducers 28a, 28b, at a specific track on the hard disk 24. The second level is recessed from the first level by an amount determined by the height of a voice coil assembly portion of the rotary actuator 30. The second level is defined, at least in part, by a second well 74 and a third well 76. The third well 76 is located in the area bounded by the spin motor mounting hole 68, the first well 70, and the first and second reinforcing ribs 72a, 72b. The third level is recessed from the second level by an amount determined by the distance from the mounting flange 118 of the spin motor to the lower surface of the hard disk 24. The third level is defined, at least in part, by an area 78. When the housing 22 is assembled, it is approximately 4" in length and 2.75" in width. The height of the housing, due to the aforementioned three-level characteristic varies between 0.38", 0.34" and 0.27".

The disk drive apparatus 20 also includes a printed circuit board 82 having an upper side 84 and a lower side 86. The printed circuit board is approximately 4" in length and approximately 2.75" in width. Electronic circuitry 88 for controlling the spin motor 26, the transducers 28a, 28b, and the rotary actuator 30 are located on the upper and lower sides 84, 86, of the printed circuit board 82. Attached to one edge of the printed circuit board 82 is a connector 90 that interfaces the electronics 88 with a first flexible circuit 92 that provides a communication path between the electronics 88 and the transducers 28a, 28b, together with the rotary actuator 30. The connector 90 also provides an interface between the electronics 88 and a second flexible circuit 94 that allows the electronics 88 to communicate with the spin motor 26. The first and second flexible circuits 92, 94, both extend from the connector 90 through gaps (not shown) between the lid 32 and the base plate 38 of the housing 22 to, respectively, the rotary actuator 30 and the spin motor 26.

Figure 5:
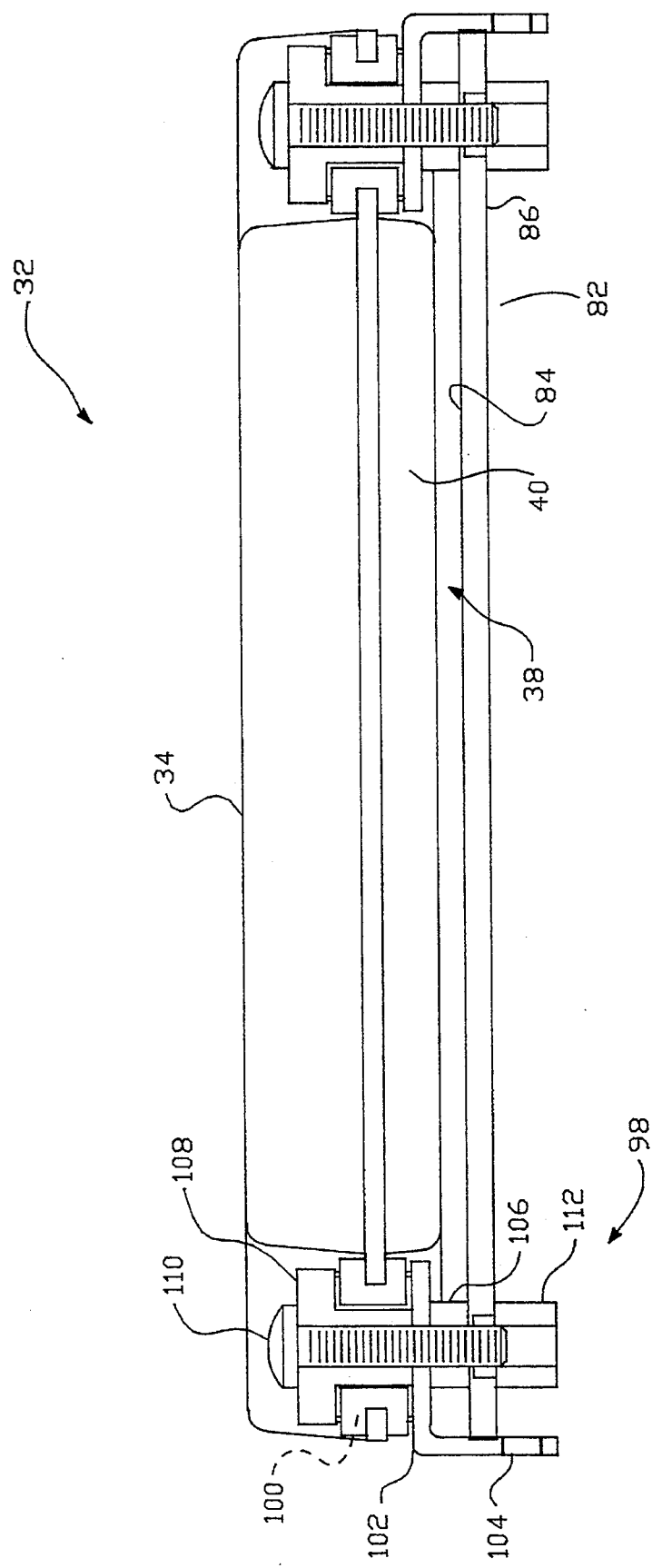
FIG. 5 is a detailed cross-sectional view of the frame assembly used to connect the housing portion to the printed circuit board in the preferred embodiment of the disk drive apparatus.

The disk drive apparatus 20 also includes a distributed frame system 98 for attaching the housing 22 to the printed circuit board 82 in a stacked or piggyback relationship where the upper side 84 of the printed circuit board 82 faces the base plate 38 of the housing 22. With both the housing 22 and the printed circuit board 82 having footprints approximately 4.00" by approximately 2.75", the piggyback relationship established by the distributed frame system 98 results in an overall footprint, including the distributed frame system 98, for the disk drive 20 of approximately 4.00" by approximately 2.8". With reference to FIG. 5, a cross-sectional view of a portion of the distributed frame system 98 that is used to connect a corner of the housing 22 to a corner of the printed circuit board 82 is illustrated. The illustrated portion of the distributed frame system 98 includes a vibration isolator 100 which is made of a shock-absorbing material and located in a hole in the base plate 38 of the housing 22. In contact with the lower surface of the vibration isolator 100 is a L-shaped mounting bracket 102 for use in attaching the disk drive apparatus 20 to the user's computer system. The L-shaped mounting bracket 102 includes a mounting hole 104 that allows the disk drive apparatus 20 to be side-mounted in the user's computer system. A spacer 106 is located intermediate the L-shaped mounting bracket 102 and the printed circuit board 82 to establish the desired clearance between the housing 22 and the printed circuit board 82. A ferrule 108 is in contact with the upper and interior surfaces of the vibration isolator 100. A screw 110, that extends through a hole defined by the ferrule 108, and corresponding holes in the L-shaped mounting bracket 102, spacer 106, and printed circuit board 82 mates with a shouldered nut 112 to connect the housing 22 to the printed circuit board 82. The four corners of the base plate 38 are attached to the corresponding four corners of the printed circuit board 82 in the manner illustrated in FIG. 5. One advantage of the distributed frame system 98 is that, due to its relatively low surface area relative to the housing 22, it does not require any grounding. Preferably, the surface area of the distributed frame system 98 does not exceed 5% of the surface area of the housing 22. The distributed frame system 98 also possesses extremely low mass. Another advantage of the structure of the distributed frame system 98 is that it provides side mounting capability as well as top and bottom mounting capability. Side mounting capability is provided by the L-shaped mounting bracket 102 which includes the side mounting hole 104. Bottom and top mounting capability can be achieved by appropriate use of the screw 110 and the shouldered nut 112.

Figure 12A:
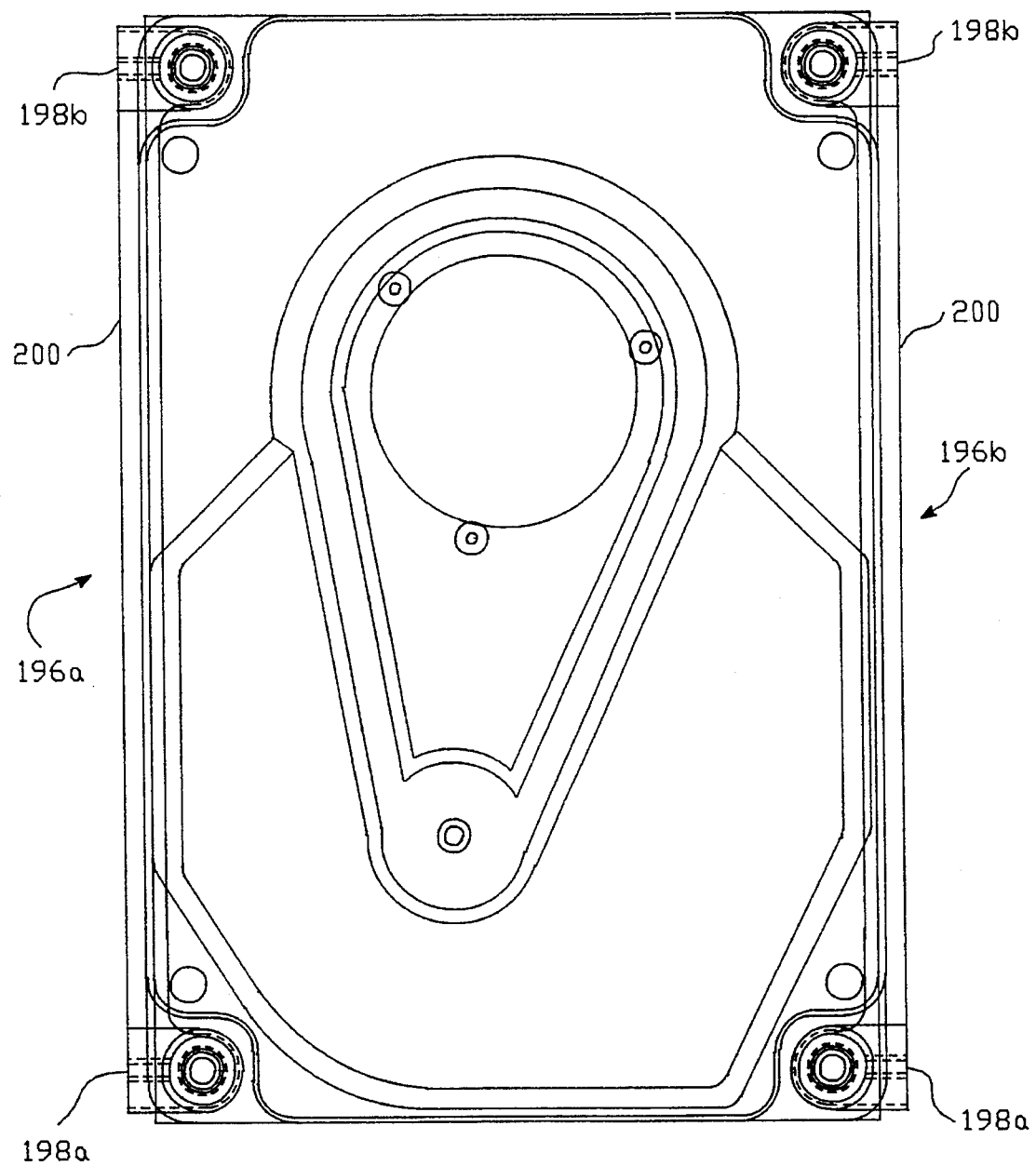
FIG. 12A is a top view of an alternative embodiment of the distributed frame system and the baseplate.
Figure 12D:
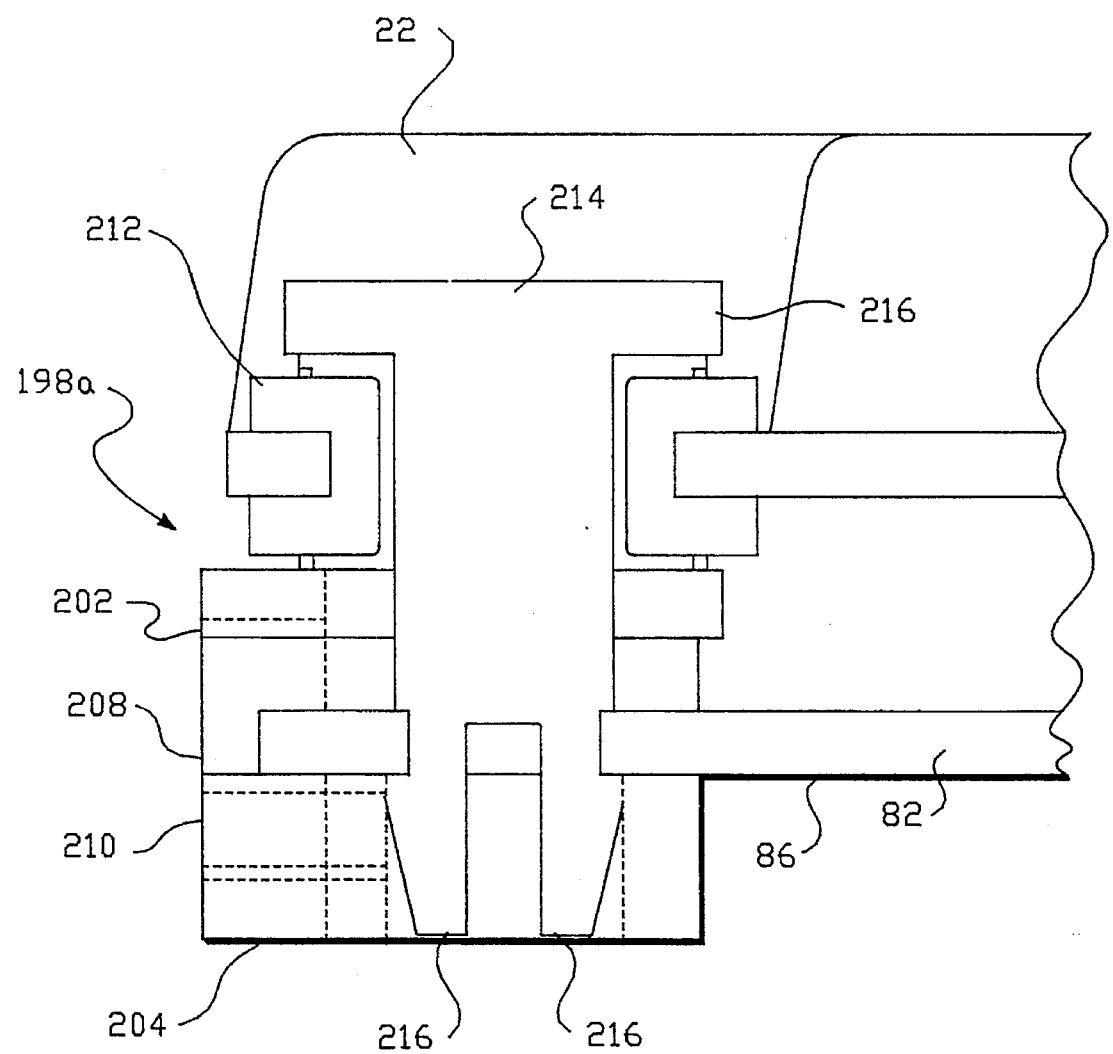
FIG. 12D is a detailed view of the connective structure between a corner of the housing and the printed circuit board in the alternative embodiment of the distributed frame system.

With reference to FIGS. 12A through 12D, an alternative embodiment of the distributed frame system 98 is illustrated. The alternative embodiment of the distributed frame system 98 includes a first member 196a for connecting two corners of the housing 22 to the printed circuit board 82 and an identical second member 196b for connecting the other two corners of the housing 22 to the printed circuit board 82. Each of the first and second members 196a, 196b, includes a first connecting portion 198a and a substantially identical second connecting portion 198b that are integrally connected by a rail 200. The first and second connecting portion 198a, 198b, each connect one corner of the housing 22 to the printed circuit board 82. With reference to FIG. 12C, the connecting portions 198a is described in greater detail. The connecting portion 198a includes an upper section 202 that is separated from a lower section 204 by a slot 206 that receives an edge of the printed circuit board 82. An intermediate section 208 integrally connects the upper and lower sections 202, 204. A horizontal hole 210 in the lower section 204 provides side mounting capability. With reference to FIG. 12D, the alternative embodiment of the distributed frame 98 further includes a shock absorbing element 212 located in a hole in the corner of the housing 22. The shock absorbing element 212 operatively contacts the upper section 202 of the connecting portion 198a. The alternative embodiment of the distributed frame system 98 further includes a snap-in connector 214 that extends through a hole defined by the shock absorbing element 212, a corresponding hole in the connecting portion 198a and a hole through the printed circuit board 82. The snap-in connector 214 includes clips 216 that allow it to be inserted through the aforementioned holes. However, once the clips are past the printed circuit board 82 they catch against the lower side 86 of the printed circuit board 82 to establish the connection between the housing 22 and the printed circuit board 82. The snap-in connector 214 also includes a flange portion 216 that contacts the upper surface of the shock absorbing element 212 once the clips 216 catch against the lower side of the printed circuit board.

Figure 4A:
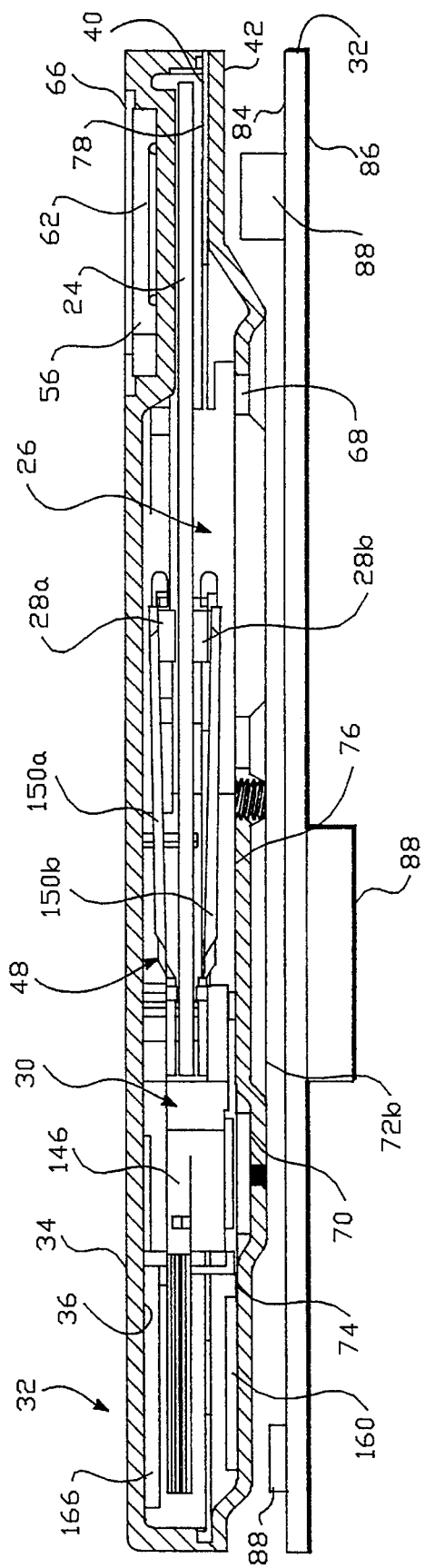
FIG. 4A is a cross-sectional view of the preferred embodiment of the disk drive apparatus that illustrates the relationship of various components of the disk drive apparatus necessary to achieve a height dimension of 0.6 inches.
Figure 4B:
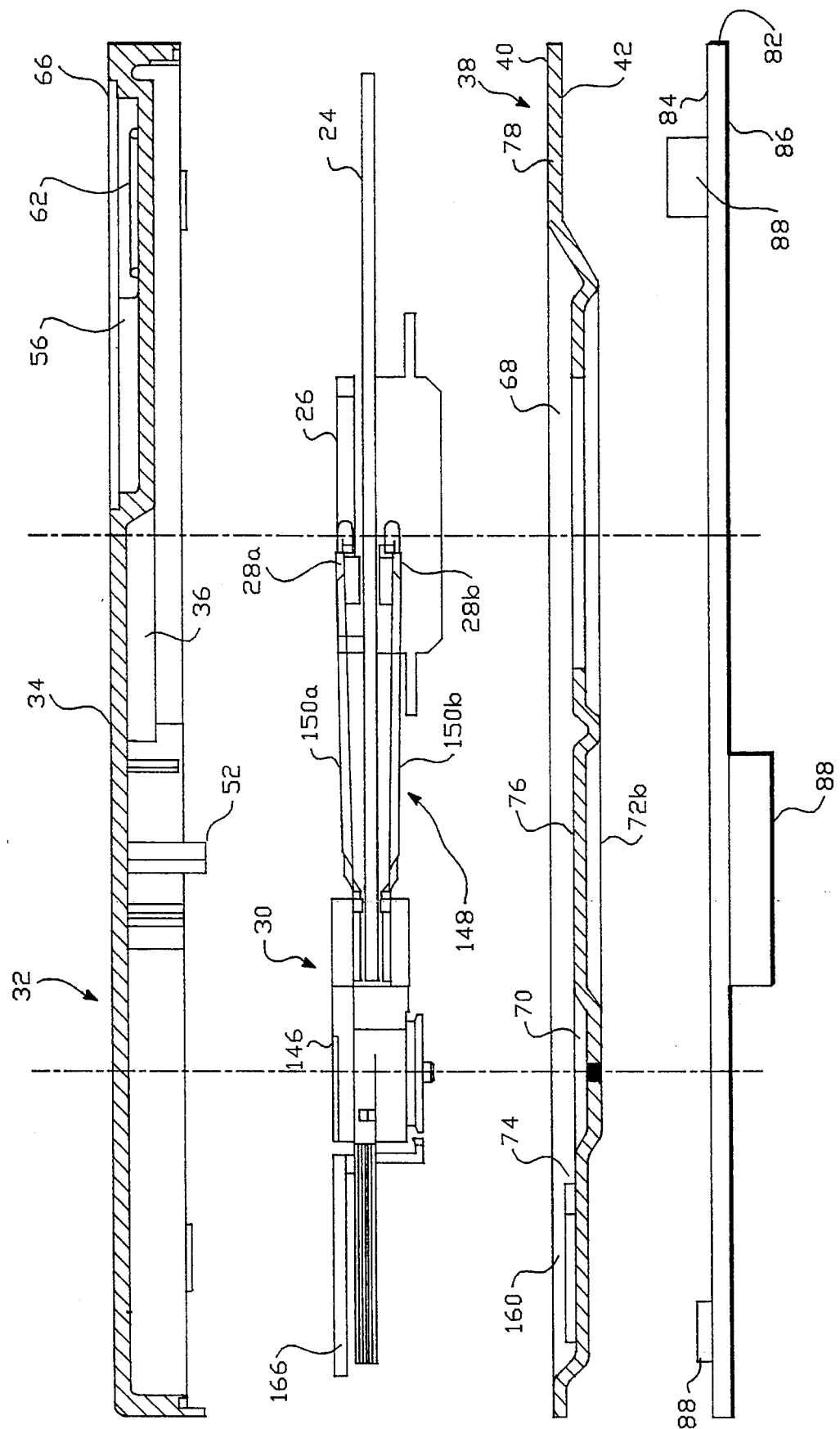
FIG. 4B is an exploded cross-sectional view of the preferred embodiment of the disk drive apparatus that illustrates the relationship of various components of the disk drive apparatus necessary to achieve a height dimension of 0.6 inches.
Figure 6:
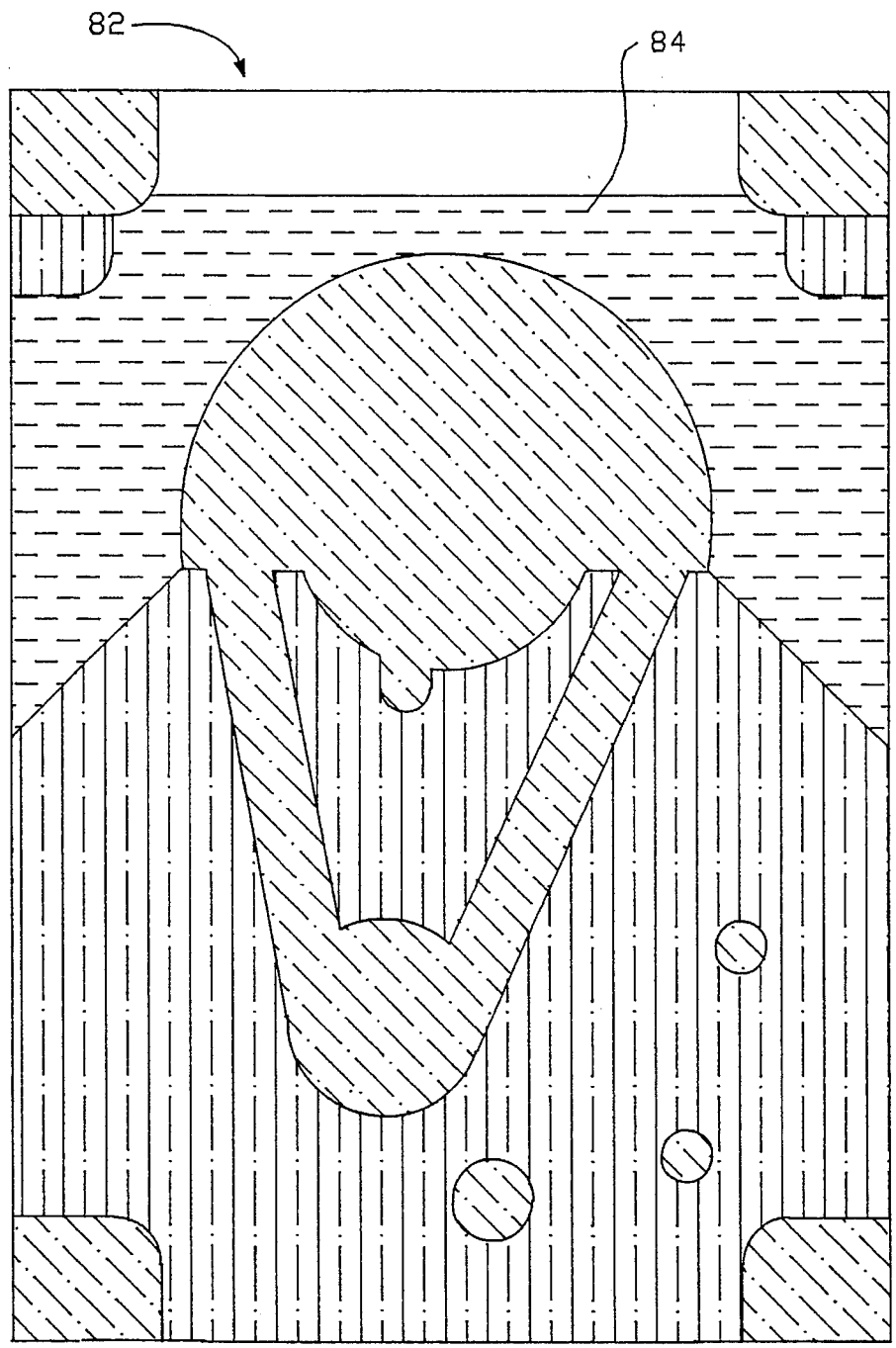
FIG. 6 is a map of the various areas on the top side of the printed circuit board where components having heights of 0.050 inches and 0.127 inches are located together with the areas where no components are located in the preferred embodiment of the disk drive apparatus.
Figure 6:
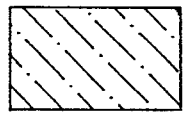
Figure 6:
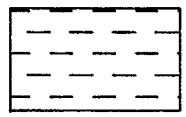
Figure 6:
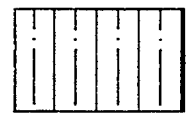

With reference to FIGS. 4A–4B, the three level base plate of the housing 22, together with the stacked relationship established by the distributed frame assembly 98 between the housing 22 and the printed circuit board 82 produces volumes between the base plate 38 and the upper side 84 of the printed circuit board that are advantageously used to achieve an overall height dimension of approximately 0.6 inches for the disk drive 20. Specifically, the components comprising the electronics 88 are laid out on the printed circuit board 82 such that the components having heights less than or equal to a specified value are located on the lower side 86 of the printed circuit board 82. Components of greater height, which if located on the lower side 86 of the printed circuit board 82 would add to the overall height dimension of the disk drive apparatus 20, are located on the upper side 84 of the printed circuit board 82 so as to occupy the volumes between the upper side 84 of the printed circuit board 82 and the third level of the base plate 38. While components having heights less than the specified value can be located on the lower side 86 of the printed circuit board 82, several of these components are located on the upper side 84 of the printed circuit board 82 so as to occupy the volumes between the upper side 84 of the printed circuit board 82 and the second level of the base plate 88. This allows the electronics circuitry for controlling the disk drive 20 to be realized within the 4.00" by 2.75" footprint of the printed circuit board 82. In the preferred embodiment of the disk drive apparatus 20, the volume extending between the upper side 84 of the printed circuit board 82 and the second level of the base plate 38 accommodates components located on the upper side 84 of the printed circuit board 82 having a nominal height of 0.050 inches. Components having a nominal height of 0.127 inches are located on the upper side 84 of the printed circuit board 82 to take advantage of the volume extending between the upper side 84 of the printed circuit board 82 and the third level of the base plate 38. The area between the upper side 84 of the printed circuit board 82 and the first level of the base plate 38 does not contain any electronic components, since to do so would increase the overall height of the disk drive apparatus 20. Located on the lower side 86 of the printed circuit board 82 are components that have a nominal height of 0.120". FIG. 6 is a map of the upper side 84 of the printed circuit board 82 that indicates the areas where no components can be located, the areas where components having a height of 0.050 inches can be located, and the areas where components having a height of 0.127 inches can be located.

Figure 7:
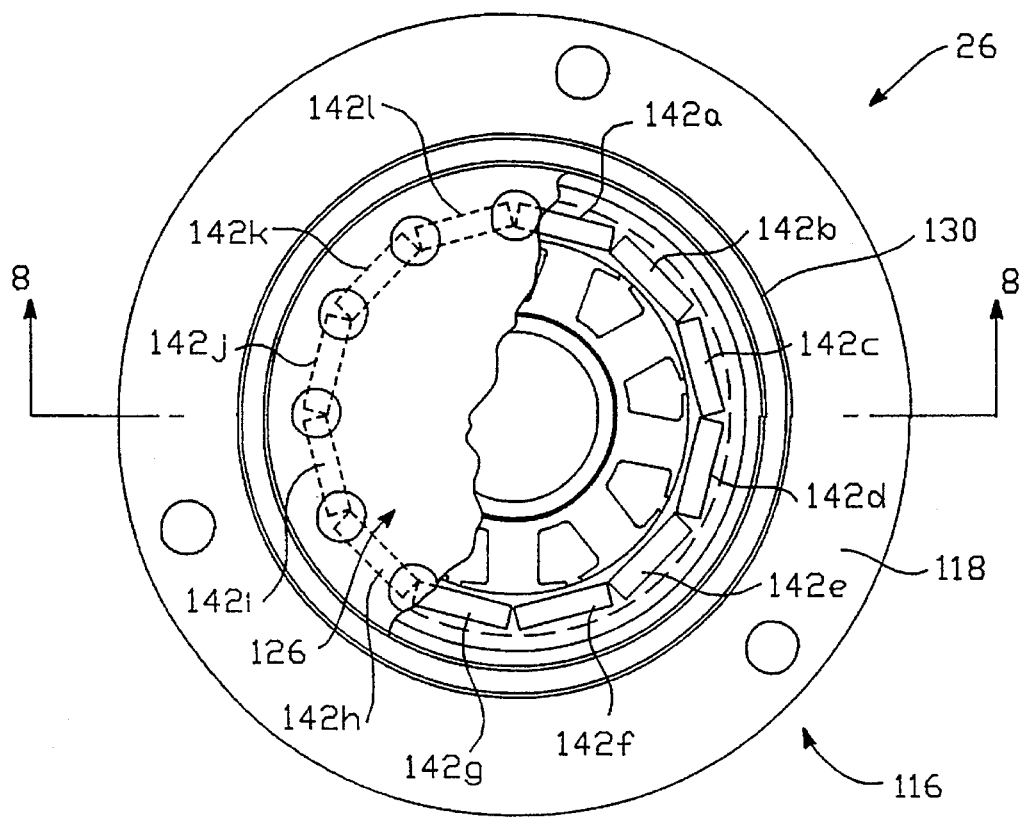
FIG. 7 is a top, cutaway view of the spin motor illustrating the substantially planar neodymium-boron-iron magnets used to achieve a reduced height dimension for the spin motor.
Figure 8:
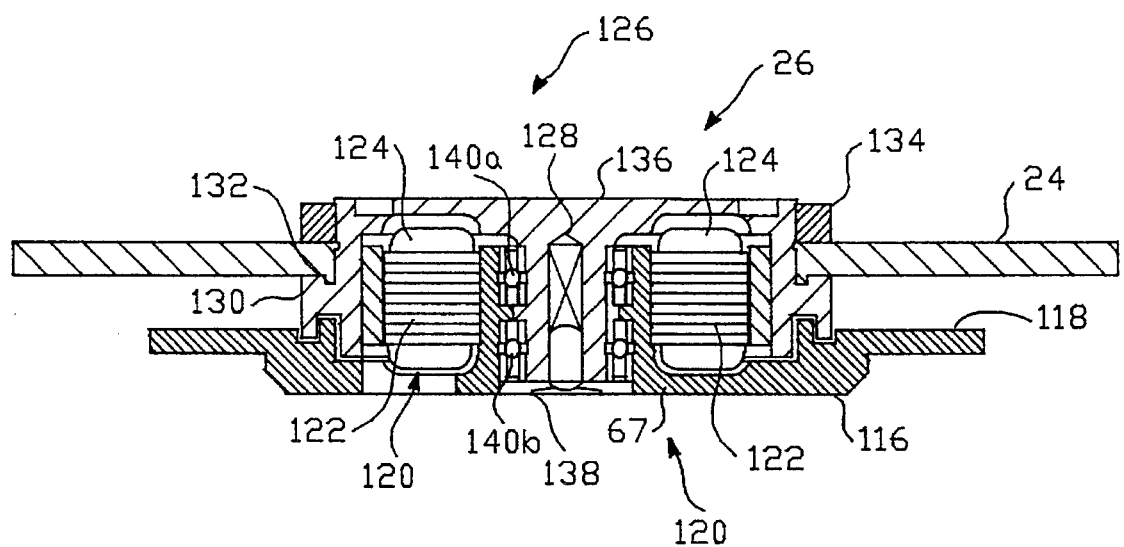
FIG. 8 is a cross-sectional view of the spin motor employed in the preferred embodiment of the disk drive apparatus to rotate the hard disk.

With reference to FIGS. 7 and 8, the spin motor 26, preferably a brushless DC motor, used in the disk drive apparatus 20 is illustrated. As previously indicated the spin motor 26 determines the maximum height dimension of the housing 22. The maximum height dimension of the housing 22, in turn, determines the overall height dimension of the disk drive apparatus 20. The spin motor 26 realizes a reduced height dimension, relative to known spin motors, that is used to realize an overall height dimension for the disk drive 20 of approximately 0.6 inches and is described hereinafter. The spin motor 26 includes a base member 116 that forms the bottom of the spin motor 26 and provides a flanged portion 118 for mounting the spin motor 26 in the spin motor mounting hole 68 of the base plate 38. The spin motor 26 further includes a stator 120 for producing, under the control of the electronics circuitry 88, a rotating magnetic field. The stator 120 includes stator laminations 122 and stator windings 124, as is well known in the art, for use in producing the aforementioned rotating magnetic field. The stator laminations 122 and stator windings 124 are operatively connected to the base member 116. The spin motor 26 further includes a rotor assembly 126 that, in response to the rotating magnetic field produced by the stator 120, rotates about an axis of rotation 128. The rotor assembly 126 includes an outer shell 130 that has a shoulder 132 for supporting the hard disk 124. A clamp ring 134 is used to hold the hard disk 124 in place against the shoulder 132 of the outer shell 130. Preferably, the clamp ring 134 is threaded to operatively engage a threaded surface on the upper, circumferential edge of the outer shell 130. The rotor assembly 126 also includes a rotor shaft 136 that is integral with the outer shell 130 and fits within a central opening 138 defined by the base member 116. First and second bearing/race assemblies 140a, 140b, are located intermediate the rotor shaft 136 and the portion of the base member 116 defining the central opening 138 to allow the rotor assembly 126 to rotate relative to the base member 116 as well as provide support. The rotor assembly 126 further includes twelve magnets 142a–l, each of which has a north pole face and a south pole face, that are attached to the interior surface of the outer shell 130 such that adjacent magnets have opposite poles facing the stator 120. Interaction of the magnetic fields produced by the magnets 142a–l with the rotating magnetic field produced by the stator 120 causes the rotor assembly 126 to rotate about the axis of rotation 128. For the spin motor 126 to have a reduced height dimension relative to known spin motors, the height of the magnets 142a–l must be reduced. Reducing the height of the magnets 142a–l, however, results in the magnets 142a–l having an insufficient flux density when typical magnetic materials are used. Consequently, the magnets 142a–l are made from a material including a rare earth, such as neodymium or samarium. Preferably, the magnets 142a–l are made from a material that includes neodymium, boron and iron. The material is produced using a sintering process. The utilization of such materials to realize the magnets 142a–l results in magnets having a reduced height, an energy product in excess of 30 million gauss-oersteds and a motor constant of approximately 0.76 in.—oz./watt$^{1/2}$. Magnets made from this material and having such high energy products cannot be bonded with plastic or other materials to form the torous-shaped magnetic structures typically employed in spin motors. Consequently, the magnets 142a–l are substantially planar and are attached to correspondingly planar surfaces machined on the interior of the outer shell 130. Utilization of magnets 142a–l results in a spin motor having a height dimension of less than 0.35".

The rotary actuator assembly 30 embodies the well-known Whitney style technology. The rotary actuator assembly 30 includes a pivot capstan 146 that establishes the axis of rotation for the rotary actuator assembly 30. The pivot capstan 146 is located in, and attached to, the base plate 38 at the first well 70. The rotary actuator assembly 30 further includes an arm assembly 148 that is operatively attached to the pivot capstan 146 and is substantially triangular in shape. Preferably, the arm assembly 148 includes first and second arms 150a, 150b, for moving, respectively, first and second transducers 28a, 28b, relative to the upper and lower surfaces of the hard disk 24. The rotary actuator assembly 30 further includes a voice coil assembly 154 that, in response to signals from the electronics 88, causes the arm assembly 148 to rotate about the pivot capstan 146 and thereby position the transducers 28a, 28b, at a desired position over the hard disk 24. The voice coil assembly 154 includes an electromagnetic coil 156 that is operatively attached to the pivot capstan 146 by first and second legs 158a, 158b. The electromagnetic coil 156 is triangularly shaped and is wound about an axis parallel to the rotational axis of the pivot capstan 146. The voice coil assembly 154 further includes a voice coil magnet 160 for creating a steady-state magnetic field that is used in conjunction with a magnetic field produced by the electromagnetic coil 156 to rotate the arm assembly 148 about the pivot capstan 146. The voice coil magnet 160 is attached to the base plate 38 at a point below the electromagnetic coil 156. A post 162 limits the extent to which the arm assembly 148 can rotate in a counterclockwise position about the pivot capstan 146. The post 162 includes a first or inner crash stop 164 that interacts with the first leg 158a to prevent further counterclockwise rotation of the arm assembly 148 as well as prevent damage to the rotary actuator assembly 30 by absorbing some of the rotational energy of the arm assembly 148. The first crash stop 164 preferably includes a leaf spring that is cantilevered or simply supported. Also included in the voice coil assembly 154 is a flux return plate 166 for providing a portion of a magnetic circuit that constrains the magnetic flux produced by the electromagnetic coil 156 and the voice coil magnet 160 to the area between the flux return plate 166 and the housing 22. The flux return plate extends from the top of the post 162 across the electromagnetic coil 156 and down to the base plate 38. The magnetic flux return plate 166 is positioned by first and second pins 168a, 168b, and held in place by the magnetic force produced by the voice coil magnet 160. Attached to the magnetic flux return plate 166 is a second or outer crash stop 170 that limits the rotation of the electromagnetic coil 156 and, hence, the arm assembly 148 in the clockwise direction. The second crash stop 170 is made from a shock absorbing elastomeric material. The second crash stop 170 includes a first frusto-conical portion 172 that is inserted through a hole in the magnetic flux return plate 166 and serves to hold the second crash stop 170 in place. The second crash stop 170 also includes a second frusto-conical portion 174 for absorbing the rotational energy of the rotary actuator assembly 130 when it has rotated too far in the clockwise direction.

Figure 9:
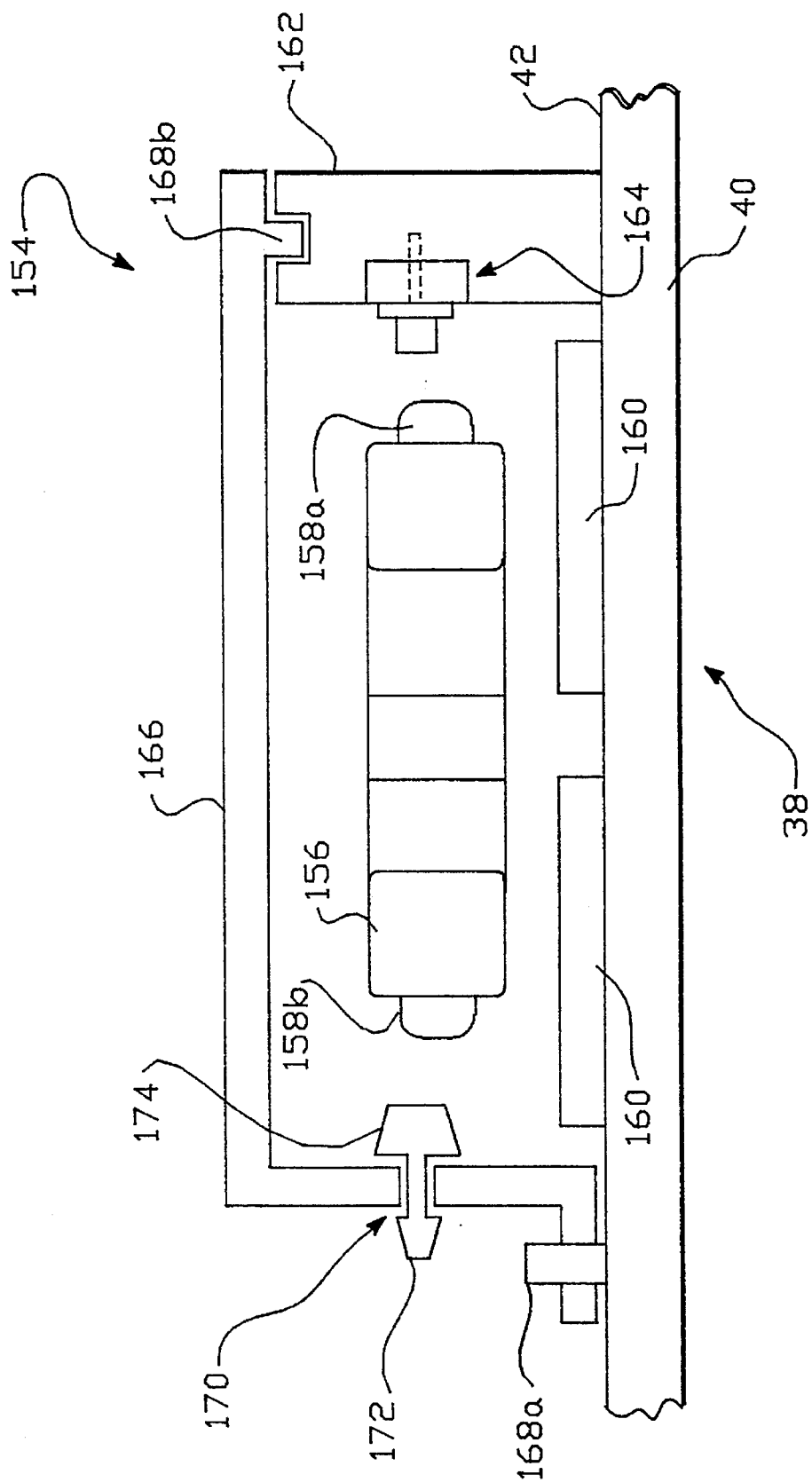
FIG. 9 is a cross-sectional view of the voice coil assembly portion of the rotary actuator illustrating the use of the housing to provide a magnetic flux return path.

The height of the voice coil assembly 154 determines where the second level of the baseplate 38 is located relative to the first level. Consequently, the height of the voice coil assembly 154 also determines the height of the volumes between the upper side 84 of the printed circuit board 82 and the second level of the base plate 38 and, hence, the height of the electronic components that can be located on the upper side 84 of the printed circuit board 82. In the preferred embodiment of the disk drive 20, components having a height of 0.050" can be located in these volumes. This, in turn, allows an overall footprint of approximately 4.0"×2.8" to be attained for the disk drive 20. With reference to FIG. 9, the low profile features of the voice assembly 154 are illustrated. The base plate 38, the post 162, and the magnetic flux return plate 166 are all made of magnetically conductive materials, such as steel, and define a magnetic circuit that constrains the magnetic fields produced by the voice coil magnet 160 to the gap between the voice coil magnet 160 and the magnetic flux return plate 166. By so constraining the magnetic field produced by the voice coil magnet 160 a high torque constant for the rotary actuator 30 is realized. In addition, the magnetic fields are prevented from affecting information established on the hard disk 24. The reduced height of the voice coil assembly 154 is attained by using the base plate 38 as flux return path, as a mounting surface for the rotary actuator assembly 30 and the hard disk 24, and as a portion of the housing 22 that prevents contaminants from affecting the operation of the disk drive apparatus 20. Consequently, the base plate 38 serves three purposes and allows a voice coil assembly of reduced height to be realized.

Figure 10:
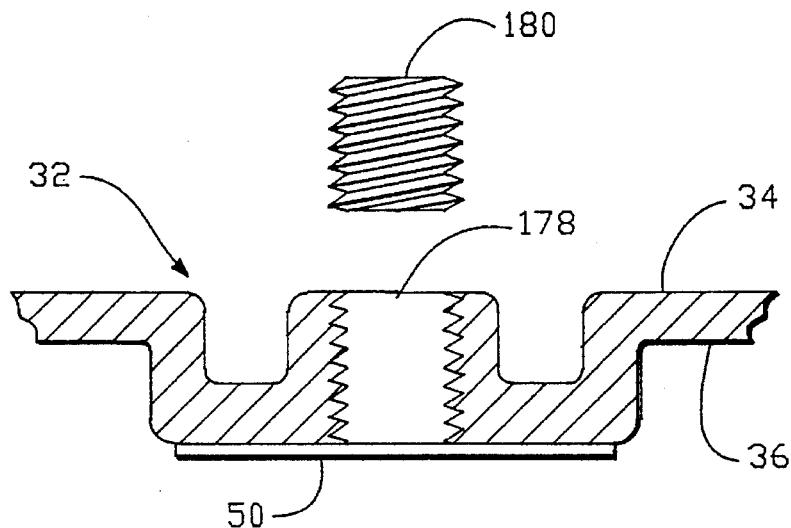
FIG. 10 is a detailed view of the construction of the ambient air filter assembly that reduces the penetration of water vapor from the ambient atmosphere into the interior of the housing in the preferred embodiment of the disk drive apparatus.
Figure 10:
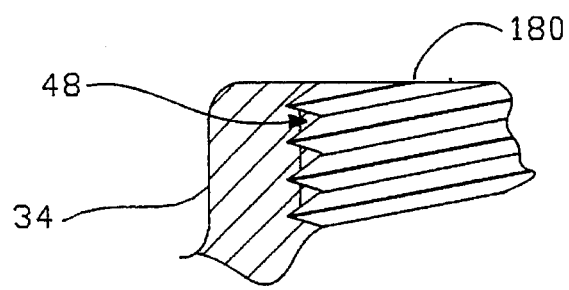
Figure 10:
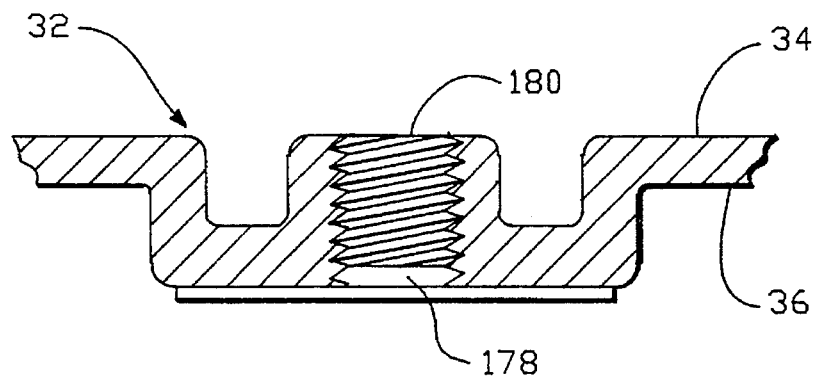

FIG. 10 is a detailed illustration of the construction of the helically-shaped hole 48 in the ambient filter assembly 46. The helically-shaped hole 46 is produced by establishing a threaded hole 178 extending from the first exterior surface 34 to the first interior surface 36 of the lid 32 using an oversized tap drill. The threaded hole 176 is then tapped with a regular or standard size tap drill to shear off the top portions of the threads in the threaded hole 176. A threaded set screw 180 is then screwed into the threaded hole 176 to establish the helically-shaped hole 46 between the bottom portions of threads in the threaded hole 178 and the top portions of the threads of the set screw 178.

Figure 11:
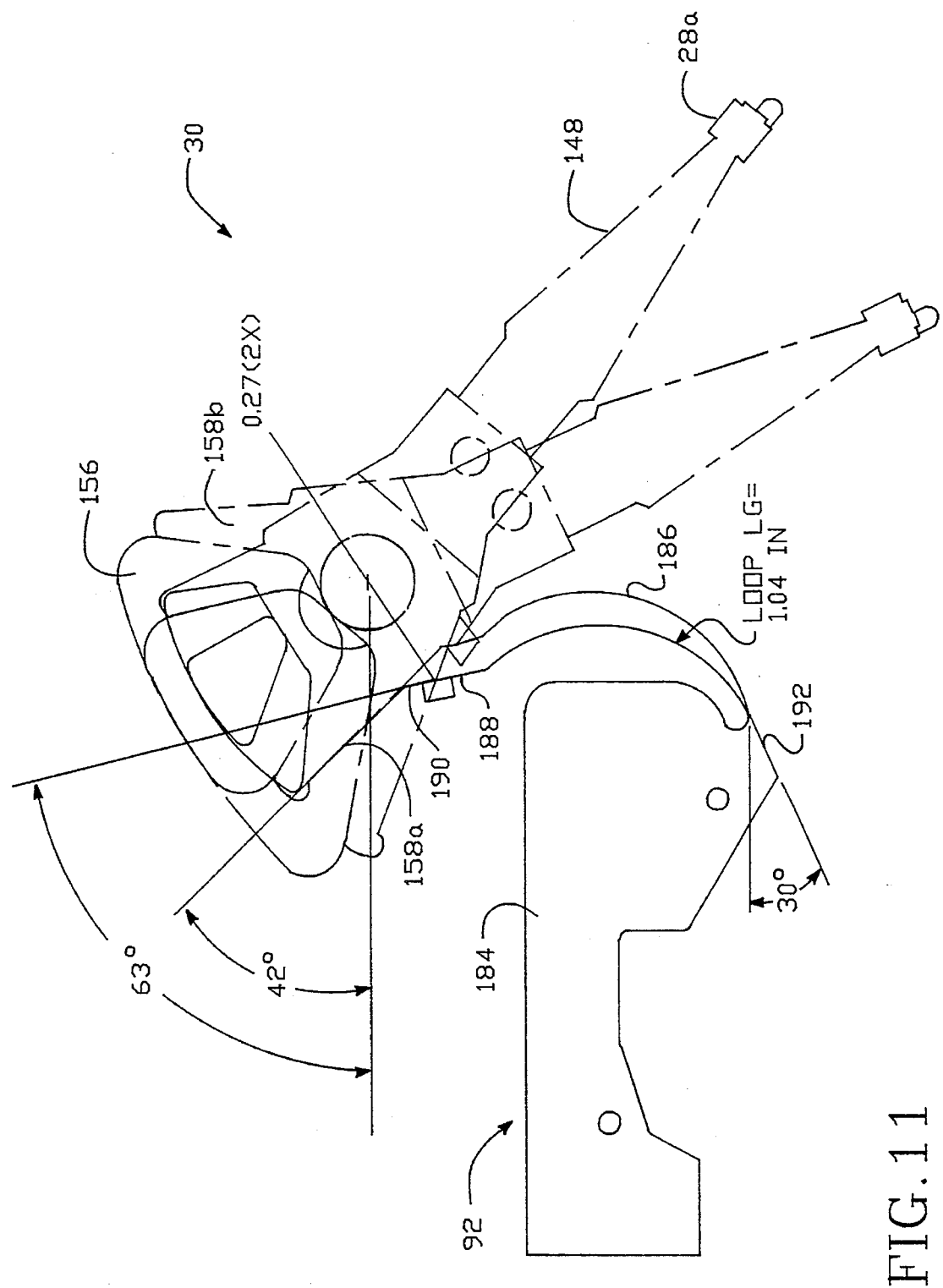
FIG. 11 illustrates the geometry of the flex circuit used to reduce the torque or force on the rotary actuator produced by the flex circuit.

With reference to FIG. 11, the torque reducing geometry of the first flexible circuit 92 is illustrated for two positions of the rotary actuator 30. The flexible circuit 92 includes a first portion 184 that extends from the connector 90 on the printed circuit board 82 through a gap (not shown) between the lid 32 and the base plate 38 to the second interior surface 42 of the base plate 38 where it is attached. The first flexible circuit 92 includes a second portion 186 having a first end 188 attached to an exterior surface 190 of the rotary actuator. 30 and a second end 192 attached to the second interior surface 42 of the base plate 38. The first flexible circuit 92 is preferably comprised of three layers of flexible material. The two outer-most layers each have a thickness of approximately 0.001 inches and are made of a flexible, insulating material, such as KAPTON. The third layer is located intermediate the two outermost layers, is also approximately 0.0014 inches thick and is made of a one-ounce conductive material, such as copper, with individual circuits etched in the conductive material. Located intermediate to each of the outer-most layers and the intermediate conductive layer is an adhesive layer having a thickness of approximately 0.0006 inches. The overall thickness of the flexible circuit 92 is approximately 0.005 inches. The thickness of the flexible circuit 92 results in a relatively low flexular modulus that, in turn, reduces the ability of the second portion 186 of the first flexible circuit 92 to apply a torque to the rotary actuator 30 that would affect the position of the first and second transducers 28a, 28b, relative to the hard disk 24. The ability of the second portion 186 of the first flex circuit 92 to apply a torque to the rotary actuator 30 is further reduced by establishing a geometry for the second portion 186 of the first flexible circuit 92 that results in a substantially radial force being applied to the rotary actuator 30. The radial force, in contrast to a tangential or torque producing force, does not substantially affect the-position of the transducers 28a, 28b, relative to the hard disk 24. The geometry of the second portion 186 of the first flexible circuit 92 is best described by analyzing the problem in terms of given parameters and the boundary conditions of the first end 186 and the second end 192 of the second portion 186 of the first flexible circuit 92. The given parameters of the problem are the flexure modulus and the length of the second portion 186 of the flexible circuit 92. Relative to the first end 188 of the second portion 186 of the first flexible circuit 92, the relevant boundary conditions are the angle through which the rotatry actuator 30 turns and the distance from the axis of rotation to the exterior surface 190 of the rotary actuator 30 where the first end 188 is attached. The boundary condition relating to the second end 192 of the second portion 186 of the first flexible circuit 92 is that it must be fixed relative to the axis of rotation of the actuator 30. Given these boundary conditions, a double or S-shaped curve can be imposed upon the second portion 186 of the flexible circuit 92 that results in a substantially radial force, as determined by a free body analysis at the point of inflection between the two curves, being applied to the rotary actuator 30 through the angle in which it rotates. The S-shaped curve of the second portion 186 that provides substantially only a radial force on the rotary actuator 30 is determined by the position of the second end 192 of the flexible circuit 92 relative to the axis of rotation of the rotary actuator 30 for the aforementioned given parameters and boundary conditions of the first end 188 of the second portion 186 of the first flexible circuit 92. Once this, point is established, the first end 188 and the second end 192 are fixed at angles that are tangential to the two curves established in the second portion 186 of the flexible circuit 92.

The foregoing description of the invention has been presented for purposes of illustration and description. Further, the description is not intended to limit the invention to the form disclosed therein. Consequently, variations and modifications commensurate with the above teachings, and the skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternative embodiments to the extent permitted by the prior art.

What is claimed is:

1. An information storage apparatus, comprising:

a record carrier;

a transducer for communicating with said record carrier;

means for moving said transducer relative to said record carrier;

a motor for moving said record carrier, said motor having a height dimension of approximately 0.35 inch, said motor including a substantially planar magnet being made from a material including at least one of the following: neodymium and samarium, said magnet having an energy product in excess of approximately 30 million gauss-oersteds, said energy product being sufficient to rotate said record carrier; and a housing for containing said record carrier, said transducer, and said motor.

2. An information storage apparatus, as claimed in claim 1, wherein:

said magnet is made from a material further including boron and iron.

3. An information storage apparatus, as claimed in claim 1, wherein:

said motor has a motor constant of at least approximately 0.76 in.—oz/watt$^{1/2}$.

4. An information storage apparatus, as claimed in claim 1, wherein:

said means for moving includes an electromagnetic coil and a voice coil magnet and said housing includes a portion of a magnetic flux return path for said voice coil magnet.

* * * * *